(12) United States Patent
Murphy et al.

(10) Patent No.: US 6,423,895 B1
(45) Date of Patent: *Jul. 23, 2002

(54) SOLAR ARRAY FOR SATELLITE VEHICLES

(75) Inventors: David Murphy, Santa Barbara; Michael Foster, Goleta, both of CA (US)

(73) Assignee: Aec-Able Engineering Co., Inc., Goleta, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/805,308

(22) Filed: Mar. 12, 2001

Related U.S. Application Data

(63) Continuation of application No. 09/436,435, filed on Nov. 8, 1999, now abandoned, and a continuation-in-part of application No. 09/400,665, filed on Sep. 20, 1999, now abandoned.

(51) Int. Cl.[7] ............................................. H01L 25/00
(52) U.S. Cl. ..................................................... 136/245
(58) Field of Search ......................................... 136/245

(56) References Cited

U.S. PATENT DOCUMENTS

| | | | | |
|---|---|---|---|---|
| 3,460,992 A | * | 8/1969 | Zakharovich et al. | 136/89 |
| 5,296,044 A | * | 3/1994 | Harvey et al. | 136/245 |
| 5,487,791 A | * | 1/1996 | Everman et al. | 136/245 |
| 5,961,738 A | * | 10/1999 | Benton et al. | 136/245 |

* cited by examiner

*Primary Examiner*—Mark Chapman
(74) *Attorney, Agent, or Firm*—Lyon & Lyon LLP

(57) ABSTRACT

A solar array according to this invention includes a solar blanket which is folded into adjacent panels that are hinged together in an accordion-folded mode at parallel hinges. A pair of foldable spines is fixed to the panels and runs the length of the array. The hinges are included in the spine. The spines are mounted at one end to a base plate, and also at the other end to a tip plate. The base plate is intended to be attached to the spacecraft structure with a yoke which will provide required standoff for rotational clearance during sun-tracking.

A pantograph deployment structure extends between the two plates. It can be retracted for storage and extended to deploy the blanket. A conductive harness is attached to the blanket to collect current from the panels.

11 Claims, 5 Drawing Sheets

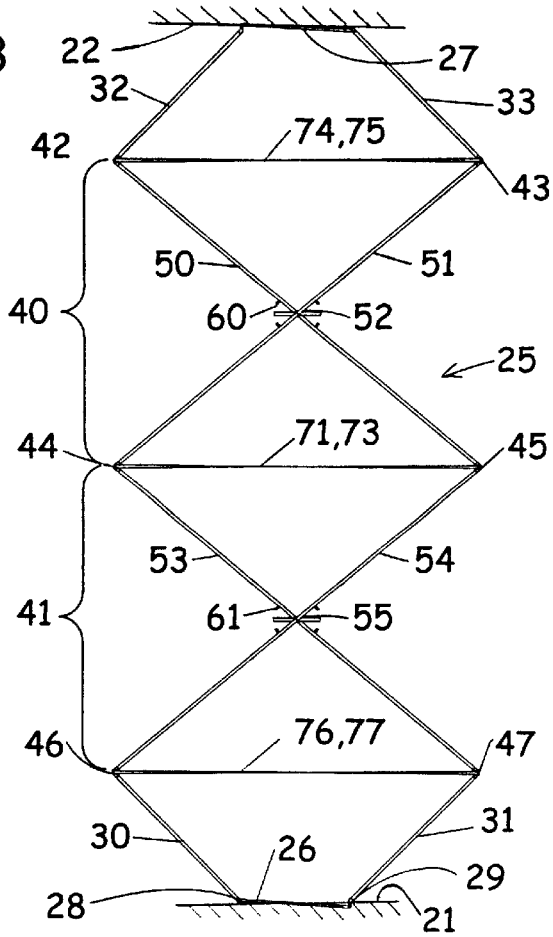
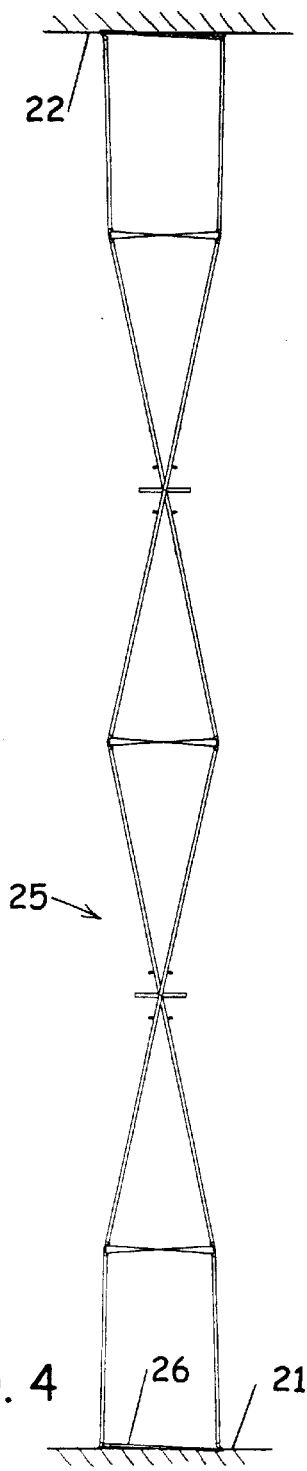
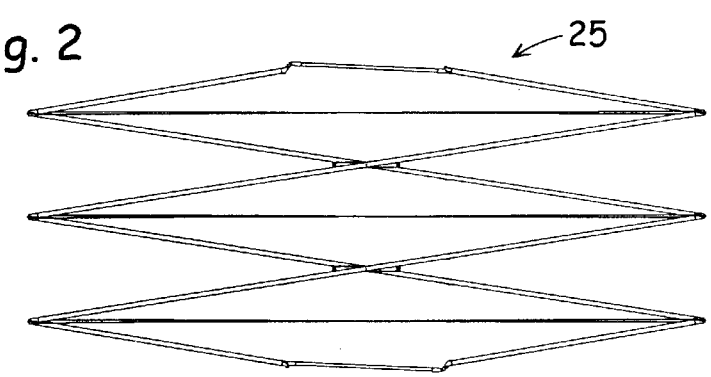
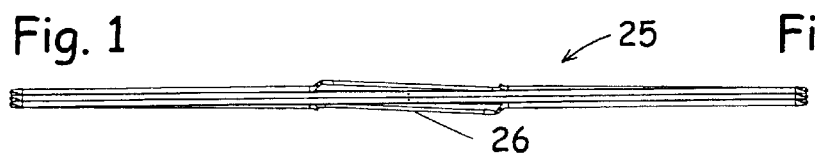

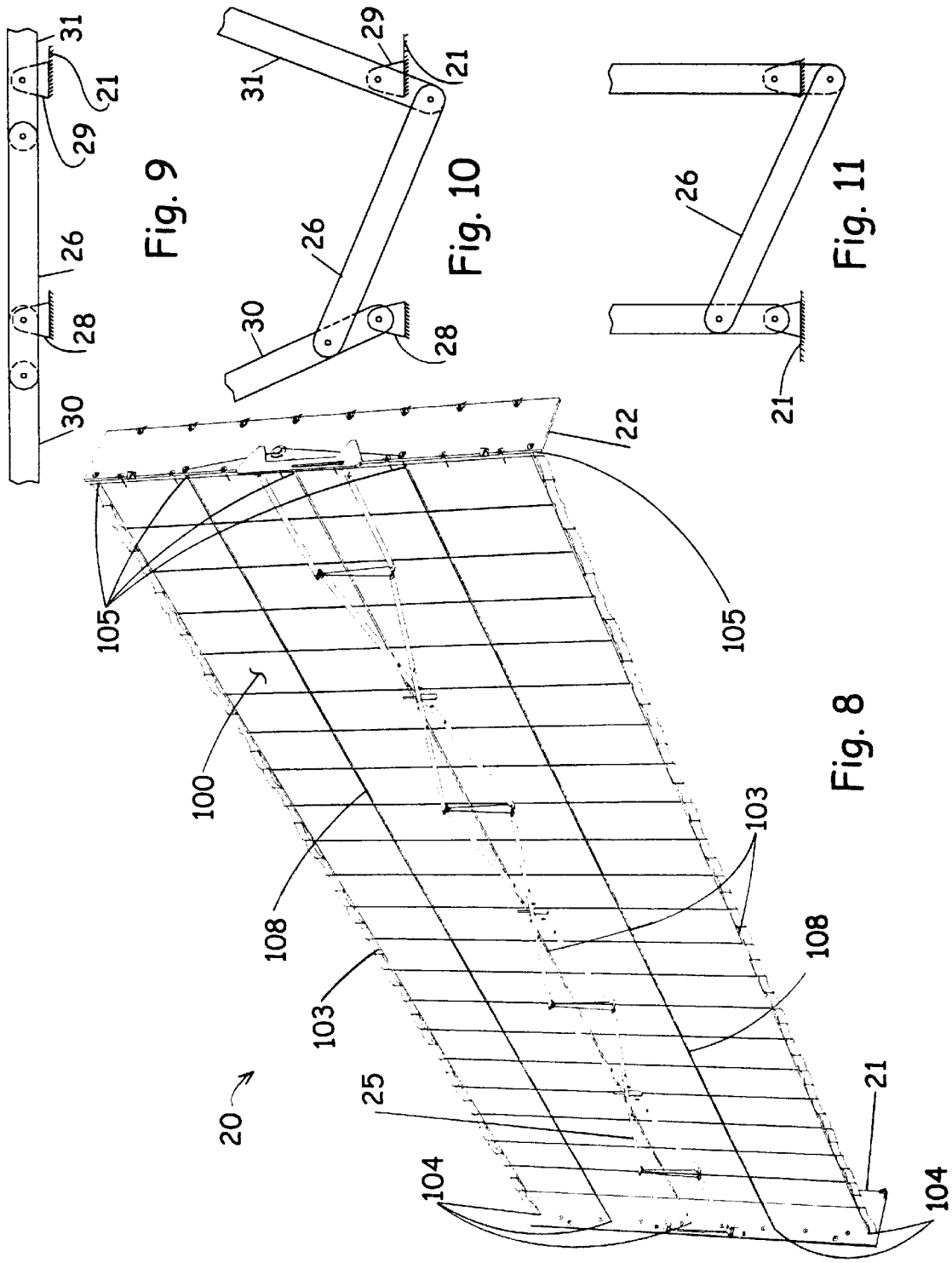

SOLAR ARRAY FOR SATELLITE VEHICLES

This application is a continuation of U.S. application Ser. No. 09/436,435, now abandoned filed Nov. 8, 1999, and a continuation-in-part of U.S. application Ser. No. 09/400,665, now abandoned filed Sep. 20, 1999.

FIELD OF THE INVENTION

A solar array to power satellite vehicles which is stowable in a small volume for shipment and launch, and that is deployable when aloft to expose a large surface area of solar collectors.

BACKGROUND OF THE INVENTION

Deployable solar arrays are typically contained in a small envelope when their space vehicle is launched. They are later deployed to an extended configuration to expose areas of solar collectors. Examples of such arrays are shown in the following United States patents:

Avilov U.S. Pat. No. 3,460,992
Harvey et al U.S. Pat. No. 5,296,044
Everman et al U.S. Pat. No. 5,487,791

A review of these patents will disclose remarkable efforts to reduce the weight and increase the reliability of these arrays. Cost, while important, has been and still is subordinate to reliability. The failure of an array to deploy and to survive for its full design life can result in loss of value of the entire craft and its payload. The cost of the craft and its payload is many times that of the array, especially when the payload is unique and employed for very advanced applications.

Because of this, and because of the relatively small number of vehicles involved, the design and manufacture of solar panels and their supporting structure has tended toward the complex, familiar, and costly. They have been carefully and slowly built, almost in a "handicraft" sense.

However, with the advent of space-based communication systems, the market for satellites has greatly enlarged. The cost of the payloads, while still considerable, has decreased. Expenses which are tolerable for a few very high value vehicles become unacceptable when the production count will run into the hundreds.

The demand for such a large number of arrays threatens to outstrip the capacity of existing manufacturing plants that were sufficient for the previous slow-paced demand. Multiplying plant capacity can permit faster production schedules, provided that additional skilled personnel can be found, and provided that the additional capital is available. Still the arrays would remain at least as costly.

Also, the problems of producibility remain. Existing constructions are built very painstakingly, because if one part is imperfectly produced, a large part of the entire array often must be scrapped or reworked at considerable cost. This risk and the unfavorable consequences which inevitably occur, has reduced the yield of these arrays.

It is the primary object of this invention to provide a solar panel which can be efficiently manufactured to high standards, and should some part of it be unsuitable, can be quickly and easily repaired or replaced. Thus the entire assembly need no longer be hostage to the acceptability of every part. Instead, all parts will be individually and readily replaceable.

The key subassembly which has the greatest vulnerability during integration and test, the highest value, and the longest repair time is the solar cell stringing. This invention proposes to separate the field of solar cells, traditionally arrayed on blanket systems, into separate but identical modules termed SPMs (solar power modules). This will allow mass production at low cost and availability for change out during test as required. Rapid integration is achieved by integrating each SPM into the "blanket" with quick attachment using a minimum number of fastening elements as described herein. The SPMs are hung onto parallel straps of thin (flexible to bending) "spines" spaced to overlay the outside edges of the SPMs. The flexible spines carry all the individual SPMs. The rows of SPMs can be folded to unfold or stow the blanket as an accordion by utilizing the flexibility of the spine straps.

With this invention, it appears likely that an array which formerly required a few months to build, can be built in a day.

However, manufacturing problems are not the only ones solved by this invention. In order to build a truly lightweight structure, the materials of construction must themselves be lightweight, and will often lack much structural strength while in a gravitational field, or in the fields of force that exist at launch or in transporting it to the site where it will be installed. To overcome this, conventional arrays simply provided more strength with more structure, and more cost.

These arrays must be stored in such a way that they can be handled on the ground without extreme care, and which will protect the array from the large launching forces. Then, when the craft is in orbit, the delicate solar blanket must controllably be deployed from the craft and be fully protected during extension to the deployed configuration. This still does not exhaust the problems of most existing arrays. Their tendency is to deploy the structure and lock it physically into a rigid structure. While there are no substantial acceleration forces on it while in orbit, a solar array can be subject to substantial internal forces, for example those which occur during the time while the craft leaves the shadow of the earth and comes into the sunlight. All too often, the different local expansions of material result in a physical snap as relative dimensions of the various parts change with rapidly changing temperature. Such forces can be damaging to the delicate parts of an array, and are a particular nuisance to proper orientation control of the spacecraft. The guide bending or "snapping" of this deployed structure causes a shift of mass centers and the spacecraft oscillates about the intended orientation until the "snap" has been damped out.

In the course of simplifying the array of this invention, the applicants have taken a different approach to cause and to assure deployment, which eliminates risk of the snapping action which is experienced in much of the prior art.

The consequence of these improvements is to increase the productivity and yield of solar arrays while still providing excellent reliability, at a significantly lower cost.

BRIEF DESCRIPTION OF THE INVENTION

A solar array according to this invention includes a solar blanket which is folded into adjacent panels that are hinged together in an accordion-folded mode at parallel hinges. A pair of foldable spines is fixed to the panels and runs the length of the array. The hinges are included in the spine. The spines are mounted at one end to a base plate, and also at the other end to a tip plate. The base plate is intended to be attached to the spacecraft structure with a yoke which will provide required standoff for rotational clearance during sun-tracking.

A pantograph deployment structure extends between the two plates. It can be retracted for storage and extended to deploy the blanket. A conductive harness is attached to the blanket to collect current from the panels.

According to a preferred but optional feature of the invention, the deployable structure lies in a plane parallel to the blanket. It includes a plurality of scissor links, and adjacent to each of the plates, a synchronizing link which compels the scissor arms to deploy in the correct direction.

According to another preferred but optional feature of the invention, tensioning springs are contained in at least some of the scissor arms, which tension a cable that tends to pull intersections of opposite scissor links toward one another, thereby to deploy the structure. Deployment is resisted by a lanyard which extends between the plates. When released, the rate at which the tip plate can separate from the base plate and deploy the blanket is limited by limiting the rate of release of lanyard from a damper. Advantageously the lanyard can pass through eyelets on the blanket panels to hold the blanket in its proper position relative to the deployment structure.

According to yet another preferred but optional feature of the invention a kicker spring may be placed at the intersections of the scissor linkages, biasing them toward the deploying direction without imparting shear forces and hence without adding drag.

According to still another preferred but optional feature of the invention, a plurality of tie-down rods are fixed to the base panel and pass through the tip panel. A releasable fastener holds the stored, accordion-folded, blanket until deployment is desired. Release of the fastener enables the array to deploy at a rate limited by the damper.

The above and other features of this invention will be fully understood from the following detailed description and the accompanying drawings, in which:

BRIEF DESCRIPTION OF THE DRAWINGS

FIGS. 1–4 are schematic showing of the deployment structure to illustrate its motions between the stored (FIG. 1) and the deployed (FIG. 4) condition;

FIG. 8 is a perspective view, partly in schematic notation, showing the deployed blanket with a schematic, deployed structure;

FIGS. 9–10 are schematic showings of the synchronizing link from the stowed configuration (FIG. 9) to the deployed configuration (FIG. 11);

DETAILED DESCRIPTION OF THE INVENTION

Figure 12B:
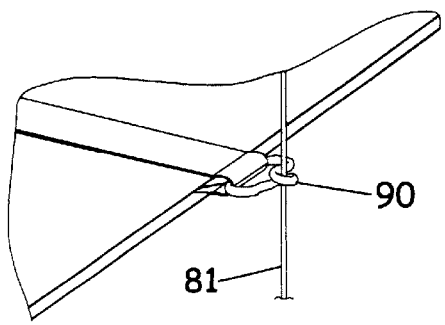
FIG. 12 is a perspective view of the entire array in an intermediate configuration.
Figure 12A:
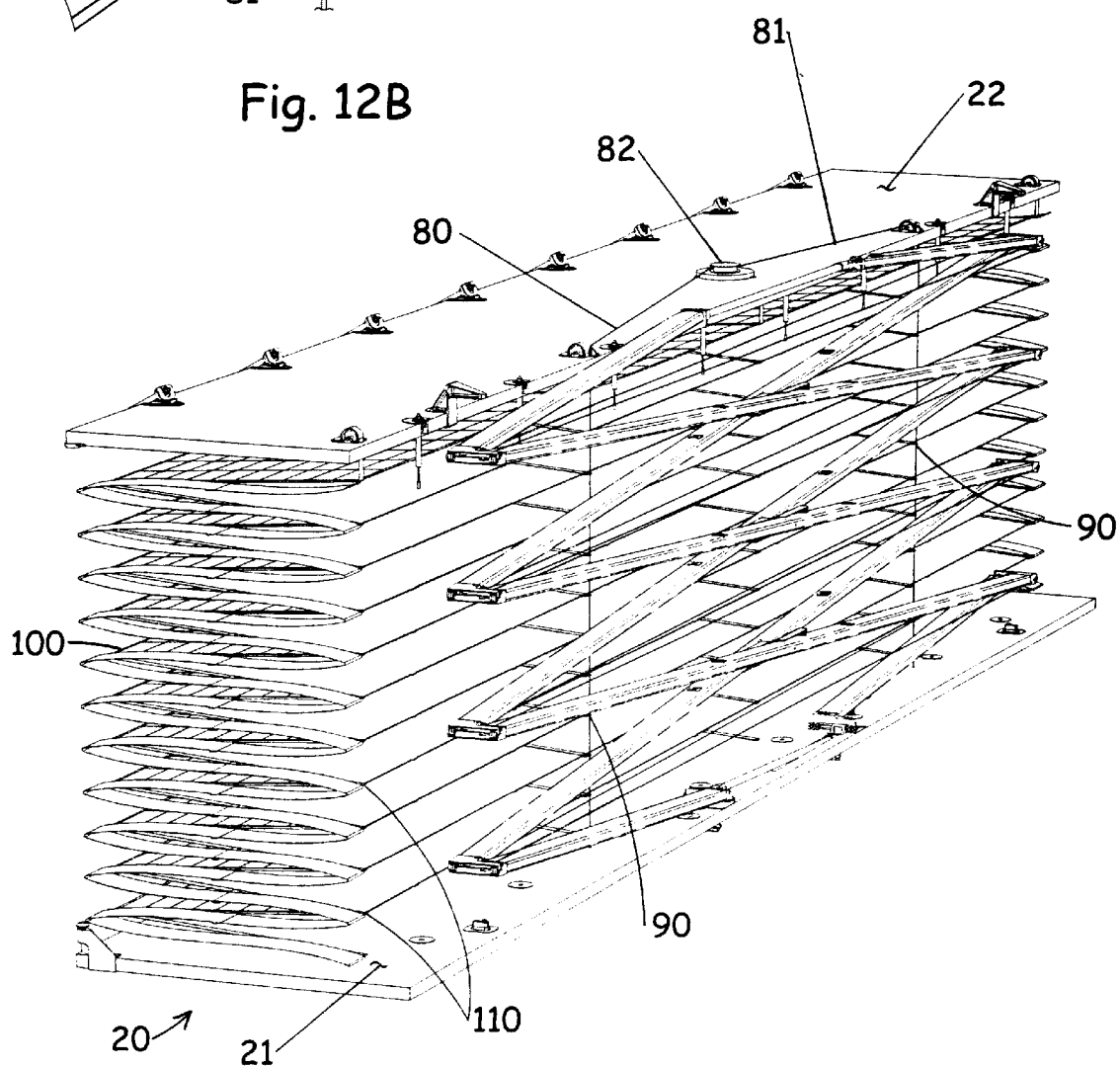

Solar array 20 is shown in FIGS. 8 and 12. It includes a base plate 21 and a tip plate 22. These plates are joined by a pantograph deployment structure 25. In FIG. 12 the structure is shown partially deployed. In FIG. 8 it is shown deployed.

As best shown in FIGS. 1 and 4, the deployment structure has synchronized link 26, adjacent to the base plate, and synchronized link 27 adjacent to the tip plate.

Synchronizer arms 30, 31 are respectively mounted to hinges 28, 29 on the base plate. Synchronizer arm 32, 33 are similarly connected to link 27. The precise construction of the synchronizer links will be disclosed later. The consequence of this arrangement is that the position of the synchronizer arms is unique for all extensions, and that the deployment will occur nearly linearly.

Two pairs of scissor links are provided: pairs 40 and 41. Their ends are hinged to an adjacent arms so they rotate in the plane of FIGS. 3 and 4. These hinged joints are shown at 42, 43, 44, 45, 46 and 47.

Scissor arms 50, 51 are pivotally joined at scissor joint 52. Scissor arms 53 and 54 are pivotally joined at scissor joint 55.

Figure 5:
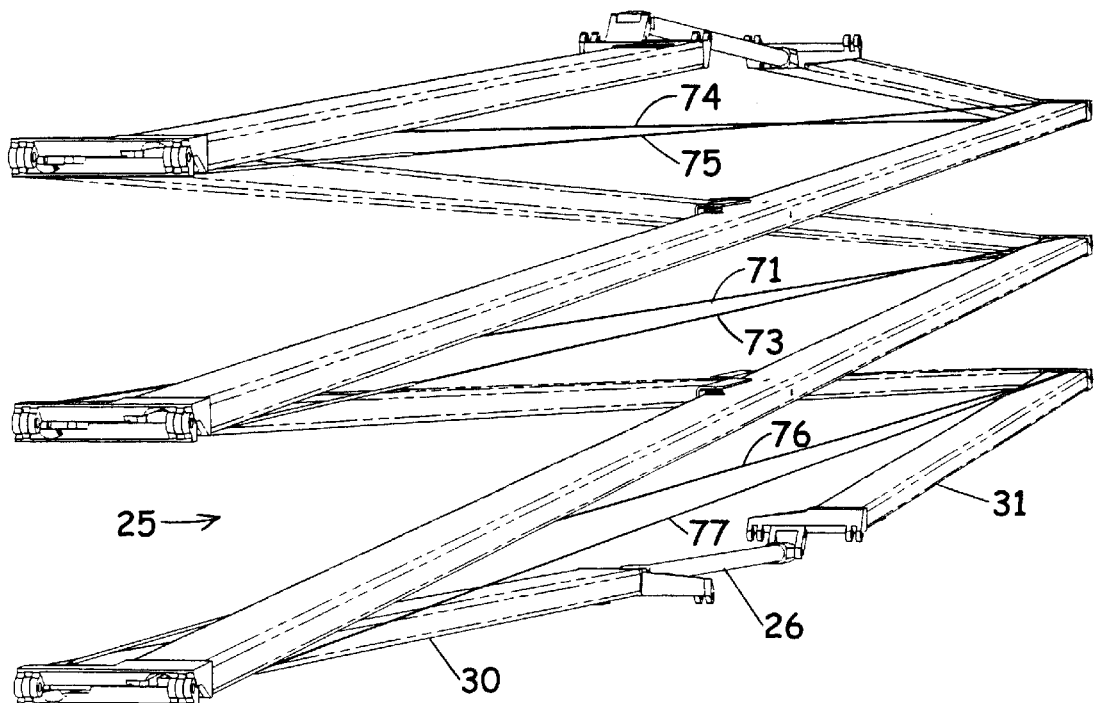
FIG. 5 is a perspective view of the deployment structure in greater detail, in an intermediate configuration.
Figures 6, 7:
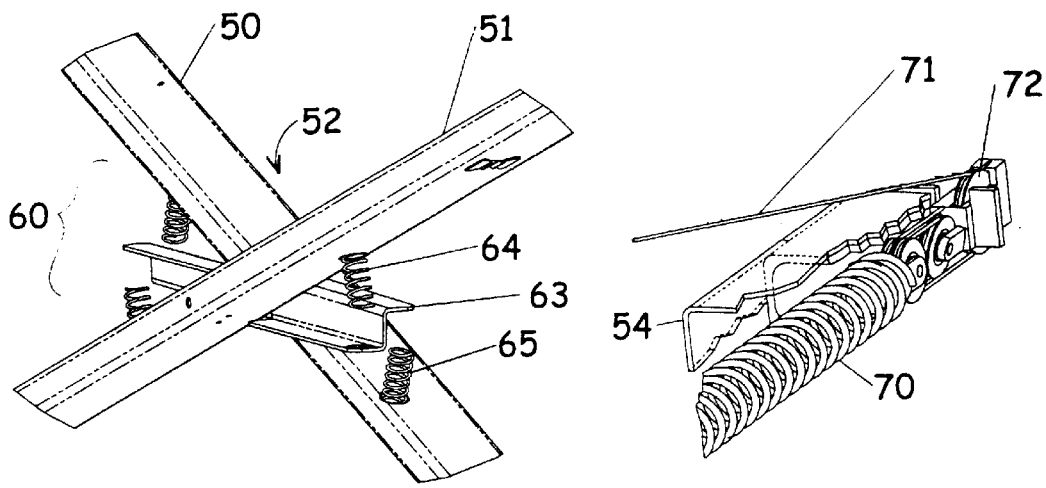
FIG. 6 is a fragmentary view showing kicker spring.
FIG. 7 is a fragmentary view showing a cable used to exert a deployment force on the structure.

Kicker springs 60, 61 are placed in scissor joints 52 and 55. Scissor joint 52 is shown in FIG. 6. It includes a pivoted central arm 63 with compression springs 64, 65 between it and the adjacent scissor arm, tending to open the angle in which they are placed. This provides an initial force tending to open the outside of the scissor joint when the array is to be deployed.

Force for deployment of the deployer mechanism is by springs contained inside the scissor arms that exert a pulling effort on a cable which passes around one scissor joint and is fixed to the opposite scissor joint. These exert a springing continuous bias force tending to draw the ends of the scissor arms together and deploy the array. One such spring 70 is shown in FIG. 7, placed in scissor arm 70. Cable 71 is bent around a cylinder 72 and extends toward the opposite hinge. Cables 73, 74, 75, 76, and 77 are shown, which all perform the identical function at their respective hinge joint.

This prevailing spring force is resisted by a pair of lanyards 80, 81. These lanyards are wound on a rotational damper 82 (FIG. 12). This damper is mounted on the tip plate. The lanyards pass through ports in the plate to extend to and connect to the base plate. When the array is stowed, the lanyards will be wound on the damper spool and the plates will be held to one another. When the tip plate is released from the base plate, the damper will limit the rate at which the lanyard will be released, and the rate of deployment will thereby be regulated. Appropriate selection of the damper and selection of spring rates will establish the rate of deployment. The damper does not exert substantial torque at very low speed, but it effectively limits the rate of extension.

To maintain the blanket in a disciplined position during deployment, the lanyards are passed through eyelets 90 on the edge of some of the panels located at the adjacent folds of the blanket.

The synchronizing links are schematically shown in FIGS. 9–11. It is hinged to synchronizing arms 30 and 31. Notice, however, that as a rigid link it extends to contact these arms at equal spacings 120 and 121 from hinges 28 and 29, but on opposite sides of the hinges. Thus, it acts as a crank for each of these arms. A rotation of one of the synchronizing arms will result in an equal and opposite rotation of the other. Therefore neither synchronizing arm can tilt farther from or nearer to the perpendicular bisector, and extension of the deployment structure along the central axis is assured.

Figure 17:
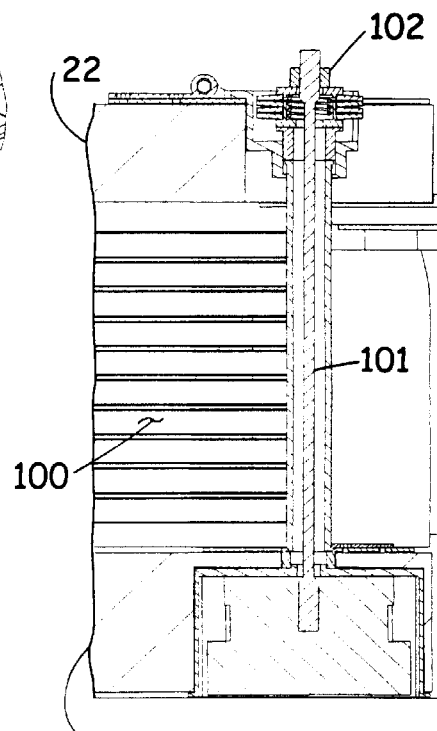
FIG. 17 is a fragmentary cross section showing a reliable feature holding the array in its stored condition.

In storage, the stowed blanket 100 (FIG. 17) is held between the base plate and the tip plate by a plurality of bolts 101 with releasable nuts 102. Releasable fasteners are well known in the fastener art, and are available with a number of release schemes. While ordinance- actuated nuts are useful, there is a preferred class in which actuation is the result of change of shape caused by heating some part of the nut.

In addition to the hold-down bolts, alignment bolts or pins, and corner braces, may be provided to resist side or shear forces on the stowed array.

This completes the description of the deployment structure. This structure provides the support and control for the blanket 100 itself. The blanket is not directly connected to the deployment structure 25. Instead, whether accordion-folded in the stowed position or extended in the blanket, it is located to the side of the deployment structure, connected to it only through the base plate and the tip plate, to which both the blanket and the structure are attached.

Attention is called to the fact that the blanket is not rigidly tensioned between the plates when deployed. Instead it is maintained deployed by a spring system which exerts a steady force while the blanket length changes due to thermal extremes. The pantograph structure is designed for near-zero thermal expansion. Since the blanket loading is constant, the structure will not undergo the snapping action which can occur in a rigid structure when it passes into and out of the earth's shadow. The unfavorable consequences of this and of any tolerance build-up are thereby obviated.

Blanket 100 is comprised of a substrate that comprises a semi-rigid backplane, solar cells on the backplane, and often a coverglass over the cells. The details of these modules are of no importance to the invention, and they will therefore not be described in full detail here. Suffice it to say that they structurally self-sufficient and planar, that the cells have circuitry and circuit connections through which electrical current pass is to be collected and utilized. Such arrangements are well-known.

Figure 16:
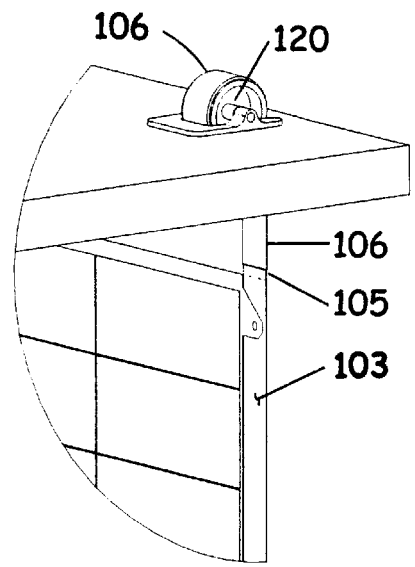
FIG. 16 is a fragmentary view showing a negator spring connecting the blanket to the tip plate.

For structural interconnection of the modules, a pair of longitudinal spines 102, 103 are attached to each of the modules. These spines extend from end to end of the blanket. End 104 is attached to the base plate. End 105 is attached to the tip plate through a constant force "negator" spring 106 (FIG. 16). Each spine is attached to each module at two locations for each module, one preferably being a rigid fixed rivet or other connector, and the other preferably permitting limited sliding between the module and the spine.

A hinge portion 110 of each spine is located between each adjacent module to provide for accordion-type folding between them. The spines are intended to be made from relatively thin, lightweight material, thin enough to serve as a hinge without reduction in thickness. If necessary, the spine can be thinned at the folding point to facilitate folding.

One or more harnesses 111, as appropriate, are attached to the edge (or edges) of the blanket, to be connected to the cell circuitry. Preferably the harnesses are ribbon-like flexible conductor assemblies carrying a number of parallel conductors. The details of their circuit connections are of no importance to this invention.

Figure 13:
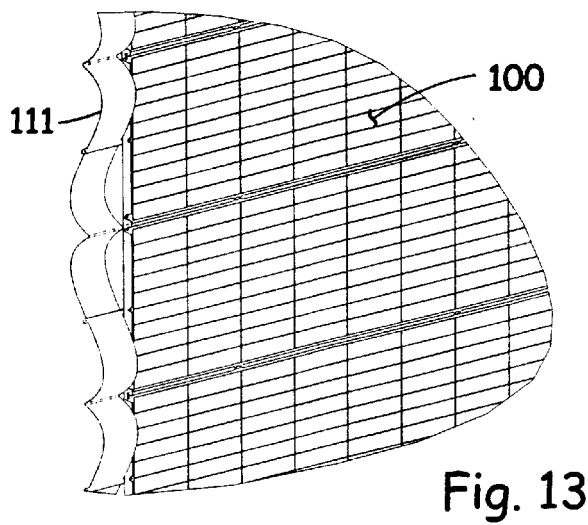
FIGS. 13–15 are schematic illustrations showing the harness from the displayed condition (FIG. 13) to the stowed condition (FIG. 15)

It is, however, best practice not to over-stress the harness conductor material with too sharp a fold. For this purpose, as shown in FIG. 13, the harness is provided with extra length and assumes an S-like shape, being attached to the modules at each fold, and at a mid point of the modules.

Figure 14:
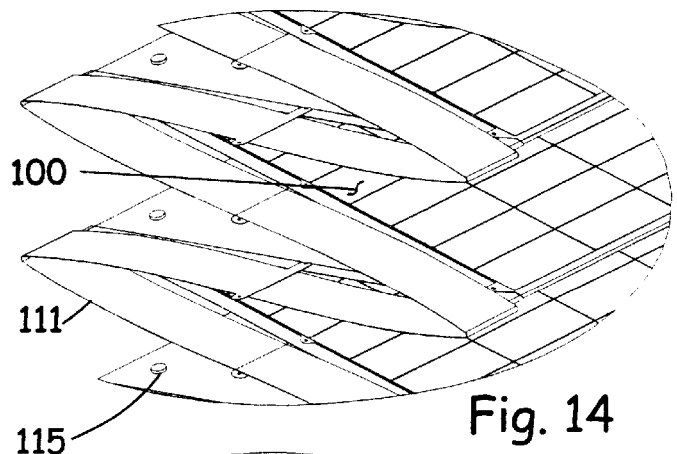
Figure 15:
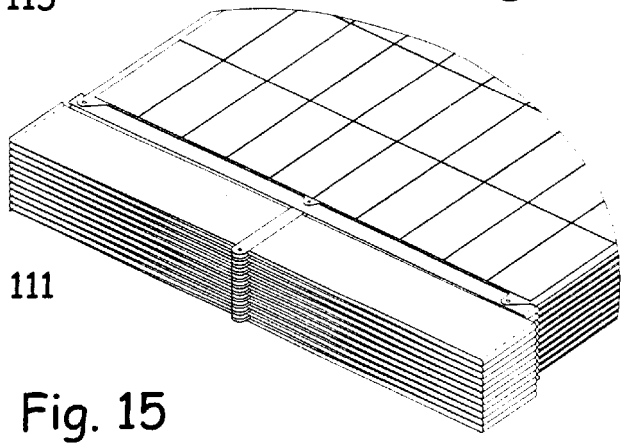

Soft buttons 115 exemplified in FIG. 14, usually made of foam, will be placed on the modules at appropriate locations to hold the modules apart when in the stowed position. They will be placed between the folds to protect the cells, and if desired may also be placed between the backplanes.

The negator spring 106 is provided to reduce the effects on the blanket of sharp movements of the deployment structure. A negator spring has an essentially zero spring constant. In the illustrated structure it comprises an appropriate spring bent over a pulley 120 and connected to the respective lanyard and to the tip plate. Its function is to "absorb" any abrupt changes in length without substantial transmission of the exerted force.

In storage, the stowed stack 100 (FIG. 17) is held between the base plate and the tip plate by a plurality of bolts 101 with releasable nuts 102. Release fasteners are well known in the fastener art, and are available with a number of release schemes. While ordinance-actuated nuts are useful, there is a preferred class in which actuation is the result of change of shape caused by heating some part of the nut. Such a nut is the preferred device because it does not apply a physical shock to the assembly.

This invention is not to be limited by the embodiments shown in the drawings and described in the description, which are given by way of example and not of limitations, but only in accordance with the scope of the appended claims.

We claim:

1. A solar array apparatus comprising:

a solar array blanket comprising a plurality of solar power modules, each said module comprising a rigid backplane bounded by a pair of parallel lateral edges and a pair of longitudinal edges, a solar cell laid on said backplane, said backplane including circuitry for incorporating said solar cell into a circuit, said modules being arranged in pairs with their lateral edges adjacent and their longitudinal edges aligned, a spine extending along said modules to which said modules are attached, said spine hinging adjacent modules to each other to enable them to be accordion-folded for stowage, an electrical harness attached to a longitudinal edge of each of said modules to which said circuitry is connected, said harness being flexible so as to permit accordion-type folding between the modules;

deployment structure comprising a base plate and a tip plate, and an axis of extension normal to said plates, said blanket being attached to both of said plates; a first pair of synchronizer arms hinge mounted to said base plate; a synchronizer link interconnecting said synchronizer arms so disposed and arranged that the each synchronizer arm always makes an equal angle with the axis of extension, a plurality of pairs of scissor arms, the members of each pair of scissor arms being joinec at a scissor joint, each said arm having a pair of ends, the synchronizer arms being hinged to the en of respective scissor arms, and the other ends of said scissor arms being hinged to the respective ends of other scissor arms, whereby to form a pantographic structure which extends when the plat are permitted to move apart from one another;

an extension tension spring anchored to each member of at least one pair of scissor arms, a cable connected to each spring passing around the joint of two adjacent scissor arms and attached to an opposite joint, whereby a pulling force exerted on the cable by the spring draws the two said last-named joints toward one another to extend the structure;

a flexible lanyard connected to and extending between said plates, tension in said lanyard resisting the extension force of said extension springs;

a releasable fastener adapted to hold the plates toward one another, holding the blanket folded, release of the lanyard enabling the springs to deploy the structure and the blanket.

2. Apparatus according to claim 1 in which said synchronizing arms are mounted to the respective plate by hinges, and which said synchronizing link is rigid and connected to each synchronizing arm by pivots which are equally distant from the respective hinge, but on opposite sides of the hinge, whereby to create a complementary crank relationship with the synchronizing arms.

3. Apparatus according to claim 2 in which said damper is a viscous type rotary damper, the lanyards being wound on said damper.

4. Apparatus according to claim 1 in which a kicker spring is mounted to said structure at least one of said scissor joints, biasing the respective scissor arms in the direction of deployment.

5. Apparatus according to claim 1 in which a damper mounted to one of said plates receives said lanyard, and limits the rate at which the lanyard can be released to enable the structure to deploy.

6. Apparatus according to claim 1 in which a negator spring is incorporated in each said spine to limit the exertion of abrupt forces on the spine.

7. Apparatus according to claim 1 in which spacers are attached to said modules to separate adjacent modules when in the stowed condition.

8. Apparatus according to claim 1 in which said releasable fastener is released by application of heat to it.

9. Apparatus according to claim 1 in which eyelets are attached to said spine at fold edges of the blanket, and said lanyards pass through said eyelets to hold the blanket against bulging.

10. Apparatus according to claim 1 in which said spine comprises a flexible tape to which said modules are attached, said tape providing a self-hinge between adjacent said modules.

11. Apparatus according to claim 10 in which two of said spines are provided, each said module being rigidly attached to each of them and also being slidingly attached to the same tape at a location spaced apart from said rigid attachment.

* * * * *